United States Patent
Ha et al.

(10) Patent No.: US 6,377,226 B1
(45) Date of Patent: *Apr. 23, 2002

(54) DUAL BAND ANTENNA

(75) Inventors: Dong-In Ha; Sang-Keun Park; Goudelev Alexandre, all of Seoul; Krylov Konstantin, Suwon, all of (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/845,959

(22) Filed: Apr. 30, 1997

(51) Int. Cl.[7] .................................................. H01Q 9/20

(52) U.S. Cl. ...................... 343/791; 343/792; 343/830; 343/895

(58) Field of Search ................................ 343/790, 791, 343/792, 829, 830, 846, 895; H01Q 5/02, 9/18, 9/20

(56) References Cited

U.S. PATENT DOCUMENTS

| | | | | |
|---|---|---|---|---|
| 4,097,870 A | * | 6/1978 | Fulmer et al. | 343/792 |
| 4,509,056 A | | 4/1985 | Ploussios | 343/791 |
| 4,940,989 A | * | 7/1990 | Austin | 343/791 |
| 5,311,201 A | * | 5/1994 | Lillie et al. | 343/791 |
| 5,563,615 A | * | 10/1996 | Tay et al. | 343/791 |
| 5,604,506 A | * | 2/1997 | Rodal | 343/791 |

* cited by examiner

Primary Examiner—Michael C. Wimer
(74) Attorney, Agent, or Firm—Dilworth & Barrese, LLP

(57) ABSTRACT

A dual band antenna for a mobile communication system which includes: a metal tube having an open end; a coaxial feed line having inner and outer conductors, with one portion of the coaxial line inserted into the metal tube, a ground plane connected to a portion of the metal tube opposite the open end and to the outer conductor of the coaxial feed line, and, a signal line electrically coupled to the inner conductor and protruding from the metal tube at the open end thereof. Preferably, the dimensions of the metal tube, the coaxial feed line and the signal line are selected such that the antenna is impedance matched to the coaxial feed line over the dual operating band, thereby obviating the need for a separate matching network.

16 Claims, 7 Drawing Sheets

DUAL BAND ANTENNA

BACKGROUND OF THE INVENTION

1. Field of the Invention

The present invention relates to an antenna and, more particularly, to a dual band antenna in which a separate matching circuit is not required between a signal source and the antenna, thereby having simple construction, convenient usage, low price and enhanced performance.

2. Description of the Related Art

In a mobile communication system, an antenna serves to conserve transmitting power and to use frequency efficiently. With the rapid development and widespread usage of mobile communications, there are frequent occurrences of capacity saturation in a conventional system. Thus, there is a need for a new system which works well in such environment and an interlock between a conventional system and the new system. For example, interlocks are used between: (i) a Code Division Multiple Access (CDMA) system and a Personal Communication System (PCS) in Korea; (ii) an Advanced Mobile Phone Service (AMPS) system and a PCS in the United States; (iii) a Groupe Special Mobile (GSM) system and a Digital European Cordless Telephone (DECT) system; or (IV) a GSM system and a Digital Communication System (DCS) 1800 system, applying the GSM to band 1,800 MHz in Europe. Such interlock systems are commonly called dual band systems. That is, a dual band system interlocks two different systems having frequency bands different from each other.

In conventional dual-band systems having different antennas for the respective two bands, there exists duplication in material costs which makes miniaturization and weight reduction difficult. Therefore, a dual band antenna usable at two bands has been developed.

U.S. Pat. No. 4,509,056 discloses a multi-frequency antenna employing tuned sleeve chokes. FIG. 1 is a section view illustrating the construction of a monopole antenna operating at dual frequency according to an embodiment of the multi-frequency antenna employing tuned sleeve chokes. As shown in FIG. 1, an outer conductor 6 of a coaxial feed line 2 is connected to a ground plane 20 and an extension 10 of an inner conductor 8 is extended from the ground plane 20 passing through a choke 12$i$ to a radiating section indicated as dimension N. The choke is loaded with a solid dielectric insert 16$i$ and the inner surface of the shell of the choke and the outer surface of the conductor extending through the choke form a quarter wavelength ($\lambda$/4) transmission line. At high frequency, the choke forms a $\lambda$/4 transmission line which prevents coupling between an open end of shell 14$i$ of the choke 12$i$ and the extension 10. At low frequency, the choke 12$i$ is operated not as an isolation element but as a monopole antenna indicated as the entire length P at the low resonant frequency.

The dual band antenna operating as a quarter wavelength monopole antenna at high/low band frequencies has an input impedance $Z_{in}$ as defined in equation 1 and requires a 50$\Omega$ matching circuit in the case where it is connected to another circuit of the system. Here, the other circuit means a filter or a radio frequency (RF) amplifier, and when it is connected to the dual band antenna, the performance of the antenna is reduced due to impedance mismatching. Therefore, the 50$\Omega$ matching circuit should be connected for preventing the mismatching as described above.

$$Z_{in}=36+j20 \quad (1)$$

Since the above dual band antenna requires a separate matching circuit between a signal source and the antenna, it results in complicated construction, inconvenience of usage, and high price.

SUMMARY OF THE INVENTION

It is therefore an object of the present invention to provide a dual band antenna in which a separate matching circuit is not required between a signal source and the antenna, thereby having simple construction, convenient usage, low price and enhanced performance.

To achieve the above objects, an embodiment of the present invention is provided, that is, a dual band antenna for a mobile communication system which includes: a metal tube having an open end; a coaxial feed line having inner and outer conductors, with one portion of the coaxial line inserted into the metal tube. A ground plane is connected to a portion of the metal tube opposite the open end and to the outer conductor of the coaxial feed line. A signal line is electrically coupled to the inner conductor and protrudes from the metal tube at the open end thereof.

Preferably, the dimensions of the metal tube, the signal line, and the coaxial line are selected such that the impedance of the antenna is substantially matched to the impedance of the coaxial feed line over the dual band of operation. Optionally, the metal tube can be filled with dielectric to shorten the antenna length.

In a more specific embodiment, a dual band antenna for a mobile communications system includes a metal tube, a coaxial feed line having one portion inserted into the metal tube, a ground plane connected to a first end of the metal tube and to the outer conductor of the coaxial feed line, and a signal line. The signal line is connected to the inner conductor of the coaxial line at a connection point within the metal tube. The outer diameter of the coaxial line is open at the connection point, thus creating a first radio frequency (RF) choke. The metal tube has a second end that is open to create a second RF choke. The signal line passes through the metal tube and protrudes past the metal tube by a predetermined length. Predetermined values are established for: the length of the coaxial line from the ground plane to the connection point; the length of the signal line from connection point to the open end of the metal tube; the length of the protruded signal line from the open end of the metal tube; the outer diameter of the outer conductor of the coaxial feed line; and diameters of the metal tube and the signal line. These values are selected such that, in an operating frequency band of said antenna, impedance of the antenna substantially matches impedance of the coaxial line, thereby providing a low standing wave ratio on the coaxial line, and obviating the need for a separate matching network.

BRIEF DESCRIPTION OF THE DRAWINGS

These and various other features and advantages of the present invention will be readily understood with reference to the following detailed description taken in conjunction with the accompanying drawings, wherein.

DETAILED DESCRIPTION OF THE PREFERRED EMBODIMENT

Figure 1:
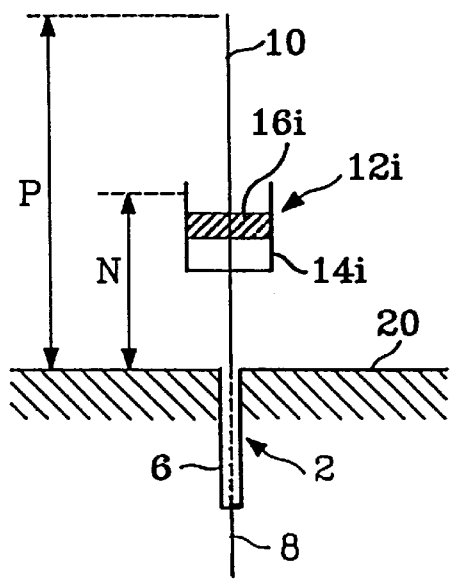
FIG. 1 is a section view illustrating the construction of a prior art monopole antenna operating at dual frequency having tuned sleeve chokes.

Hereinafter, a preferred embodiment of the present invention will be described in detail with reference to the accompanying drawings. Throughout the drawings, the same reference numerals or letters will be used to designate like or equivalent elements having the same function. Furthermore, in the following description, numerous specific details such as preferred components composing the circuit are set forth to provide a more thorough understanding of the present invention. It will be apparent, however, to one skilled in the art that the present invention may be practiced without these specific details. Known function and construction unnecessarily obscuring the subject matter of the present invention will be avoided in the detailed description of the present invention.

Figure 2:
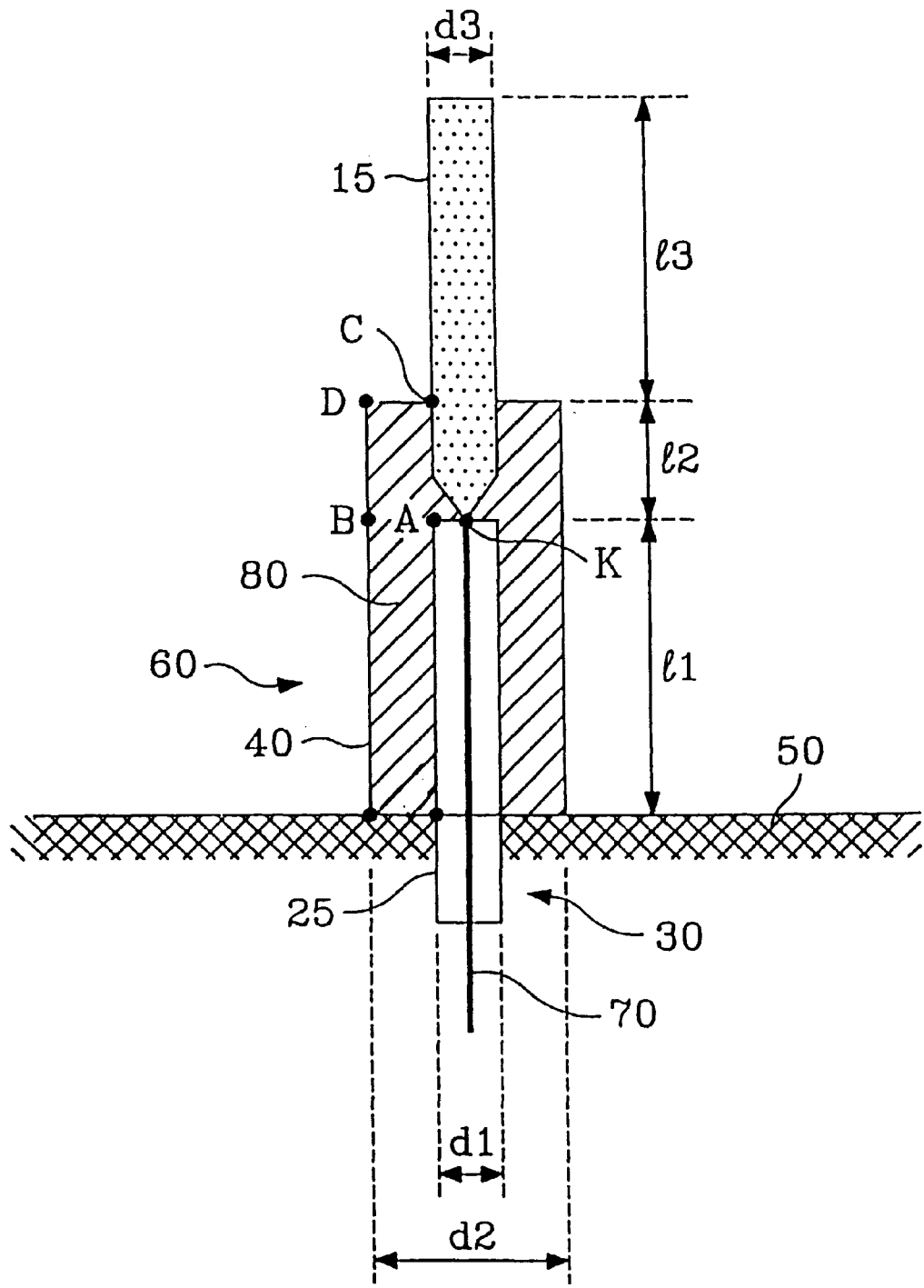
FIG. 2 is a section view illustrating the construction of a dual band antenna according to an embodiment of the present invention.

FIG. 2 is a section view illustrating the construction of the dual band antenna according to the embodiment of the present invention, which consists of a coaxial feed line 30, a choke 60 comprising a metal tube 40 and a dielectric material 80, a signal line 15 and a ground plane 50. Herein, reference marks A to B are only used for understanding of the relation between FIG. 2 and the associated drawings showing equivalent circuits.

Preferably, one end of the metal tube 40 is connected to the ground plane 50, and the other end thereof is open. The physical length of the metal tube 40 is approximately one quarter wavelength ($l_1+l_2$) at the central frequency of a high frequency band. The coaxial feed line 30 is comprised of an inner conductor 70 and an outer conductor 25, wherein one portion thereof is inserted into the metal tube 40. The outer conductor 25 of the coaxial feed line 30 is connected to the ground plane 50. The above portion of the coaxial feed line 30 inserted into the metal tube is extended from the ground plane 50 toward the opened end of the metal tube 40 by the length indicated as $l_1$. The inner conductor 70 is connected (at point K) to a signal line 15 having the same diameter $d_3$ as the diameter $d_1$ of the outer conductor 25 of the coaxial feed line 30 at the end of the coaxial feed line 30 inserted into the metal tube 40. At point K, the outer conductor 25 of coaxial line 30 is open, thus creating an RF choke (i.e., coaxial line 30 ends at point K). The opposite end of the coaxial line is connectable to electronics (not shown), used in conjunction with the antenna, such as a transmitter and/or receiver. The signal line 15 is passed through the open end of the metal tube 40, but protrudes past the open end of the metal tube 40. The metal tube 40 has the diameter $d_2$ and is filled with dielectric material 80. Since the dielectric material has a dielectric constant higher than that of air, it allows the length of the metal tube 40 to be shorter for a given electrical length (as compared to an air-filled metal tube). The open end of metal tube 40 creates a second RF choke.

Figure 3:
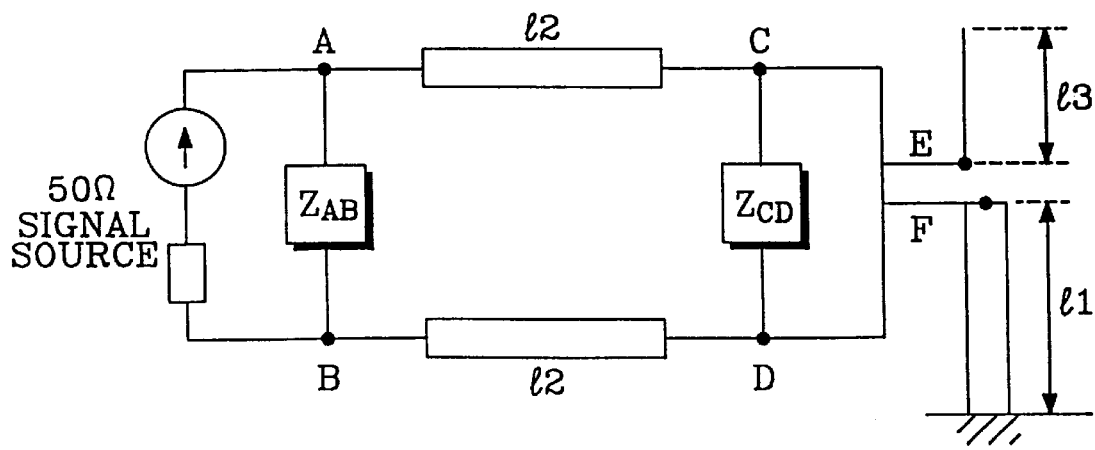
FIG. 3 is a diagram illustrating an equivalent circuit of the dual band antenna shown in FIG. 2.

FIG. 3 is a diagram illustrating an equivalent circuit of the dual band antenna shown in FIG. 2. An operation of the equivalent circuit of the dual band antenna will be described hereafter.

$Z_{AB}$ represents the impedance of the choke 60 which comprises the metal tube 40 having its width from points A to B, the coaxial feed line 30 and the dielectric material 80 filling the metal tube 40. $Z_{AB}$ is represented by equation (2) since it is theoretically operated as a short-line.

$$Z_{AB} = Z_0 \tanh(\gamma l_1) \quad Z_0 = \frac{60}{\sqrt{\varepsilon_R}} \ln \frac{d_2}{d_1}, \tag{2}$$

$$\gamma = \alpha + jk, \quad K = \frac{2\pi}{\lambda}$$

Excluding the attenuation constant α from equation (2) results in equation (3).

$$Z_{AB} = jZ_0 \tan(Kl_1) = j \frac{60}{\sqrt{\varepsilon_R}} \ln \frac{d_2}{d_1} \tan(Kl_1) \tag{3}$$

wherein,
 α: damping element,
 K: propagation constant,
 $Z_0$: characteristic impedance of short-line,
 $l_1$: length from ground plane to open end of coaxial feed line,
 $d_1$: outer diameter of outer conductor of coaxial feed line,
 $d_2$: inner diameter of metal tube,
 λ: wavelength, and
 $\in_R$: relative dielectric constant of dielectric material.

The equivalent impedance $Z_{CD}$ is calculated by the above equations 2 and 3, and if the diameter $d_1$ of the outer conductor 25 of the coaxial feed line 30 is equal to the diameter $d_3$ of the signal line 15, the impedance $Z_{CD}$ can be calculated by changing length ($l_1+l_2$). The impedance $Z_{CD}$ is indicated by equation (4).

$$Z_{CD} = j \frac{60}{\sqrt{\varepsilon_R}} \ln \frac{d_2}{d_1} \tan\left[\frac{2\pi}{\lambda}(l_1 + l_2)\right] \tag{4}$$

Figure 4:
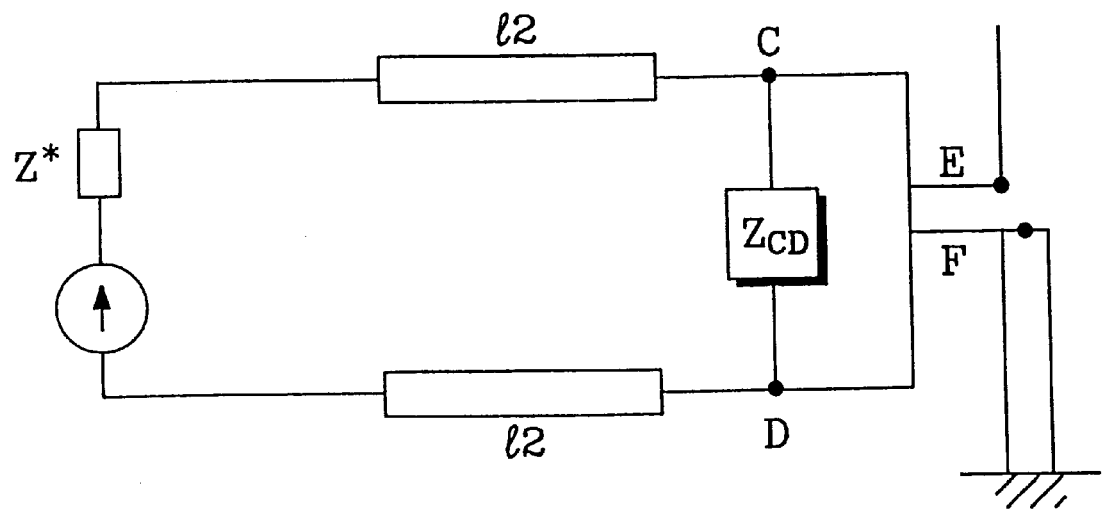
FIG. 4 is a diagram illustrating an equivalent circuit of FIG. 2, once-simplified by combining signal source and impedance $Z_{AB}$.

FIG. 4 is a diagram illustrating an equivalent circuit once-simplified by combining signal source and impedance $Z_{AB}$. Impedance Z* is represented by equation (5).

$$Z^* = \frac{50 \cdot Z_{AB}}{Z_{AB} + 50} \tag{5}$$

Figure 5:
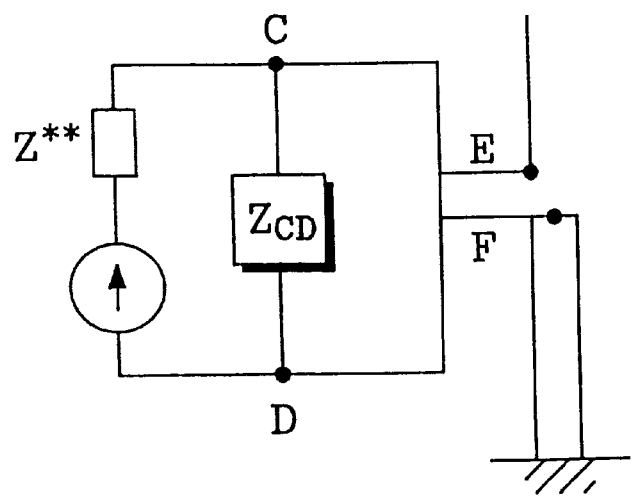
FIG. 5 is a diagram illustrating an equivalent circuit of FIG. 2, twice-simplified.

FIG. 5 is a diagram illustrating an equivalent circuit twice-simplified with the simplified equivalent circuit shown in FIG. 4. Referring to FIG. 2, since the length $l_2$ from the upper end of coaxial feed line 30 to the open end of the metal tube 40 is constructed and operated as one portion of the signal line 15 and the metal tube 40, if it is combined with the impedance Z*, the equivalent circuit as shown in FIG. 4 can be obtained. An impedance Z** according to the equivalent circuit of the FIG. 4 can be obtained as indicated by equation (6).

$$Z^{**} = Z_0 \frac{\left[\frac{Z^*}{Z_0} + \tanh(\gamma l_2)\right]}{\left[1 + \frac{Z^*}{Z_0} j\tanh(\gamma l_2)\right]} = \frac{\left[\frac{Z^*}{Z_0} + j\tan\left(\frac{2\pi}{\lambda} l_2\right)\right]}{\left[1 + \frac{Z^*}{Z_0} j\tan\left(\frac{2\pi}{\lambda} l_2\right)\right]}, \quad (6)$$

Figure 6:
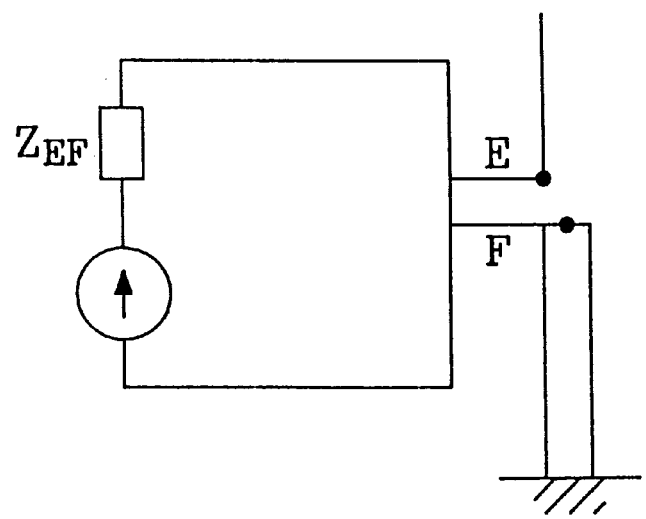
FIG. 6 is a diagram illustrating an equivalent circuit of FIG. 2, thrice-simplified by combining impedance Z** and impedance $Z_{CD}$ to form impedance $Z_{EF}$ viewed from points E and F.

FIG. 6 is a diagram illustrating an impedance $Z_{EF}$ viewed from points E and F in an equivalent circuit in which impedance $Z^{**}$ and impedance $Z_{CD}$ are combined. Then, impedance $Z_{EF}$ can be obtained as indicated by equation (7).

$$Z_{EF} = \frac{Z^{} Z_{CD}}{Z^{} + Z_{CD}} \quad (7)$$

Accordingly, impedance $Z_{EF}$ is calculated by changing variables such as frequency, dielectric constant, $d_1$, $d_2$, $l_1$, $l_2$ and $l_3$.

Figure 7:
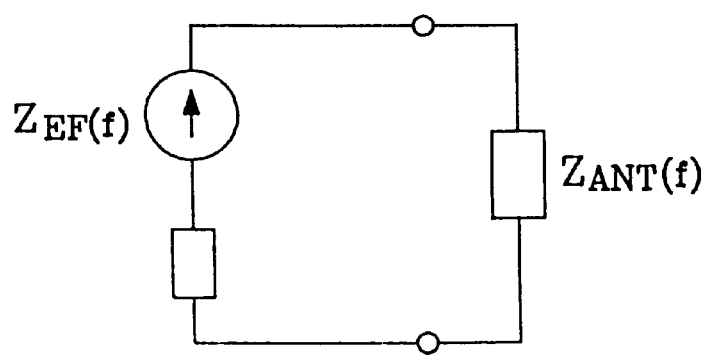
FIG. 7 is a diagram illustrating the equivalent circuit in which dielectric constant, $d_1$, $d_2$, $l_1$, $l_2$ and $l_3$ have predetermined values embodying the dual band antenna according to an embodiment of the invention.

FIG. 7 is a diagram illustrating the equivalent circuit in which dielectric constant, $d_1$, $d_2$, $l_1$, $l_2$ and $l_3$ have predetermined values embodying a dual band antenna according to an embodiment of the present invention. Since signal source impedance $Z_{EF}$ varies with operating frequency, it will be designated as $Z_{EF}(f)$. $Z_{EF}(f)$ is shown in FIG. 6 having the antenna as a load. Since antenna impedance $Z_{ANT}$ also varies with frequency, it will be designated as $Z_{ANT}(f)$. Accordingly, signal source impedance $Z_{EF}(f)$, having an integral variable matching circuit, thus equals antenna impedance $Z_{ANT}(f)$. Therefore, in the embodiment of the present invention, dielectric constant variables, $d_1$, $d_2$, $l_1$, $l_2$ and $l_3$ are varied upon construction of impedance $Z_{EF}(f)$, so that impedance $Z_{EF}(f)$ and impedance $Z_{ANT}(f)$ can be embodied to be equal to each other. Thus, a matching condition between the signal source and the antenna can be exactly achieved and can improve the characteristics of the dual band antenna.

Figure 8:
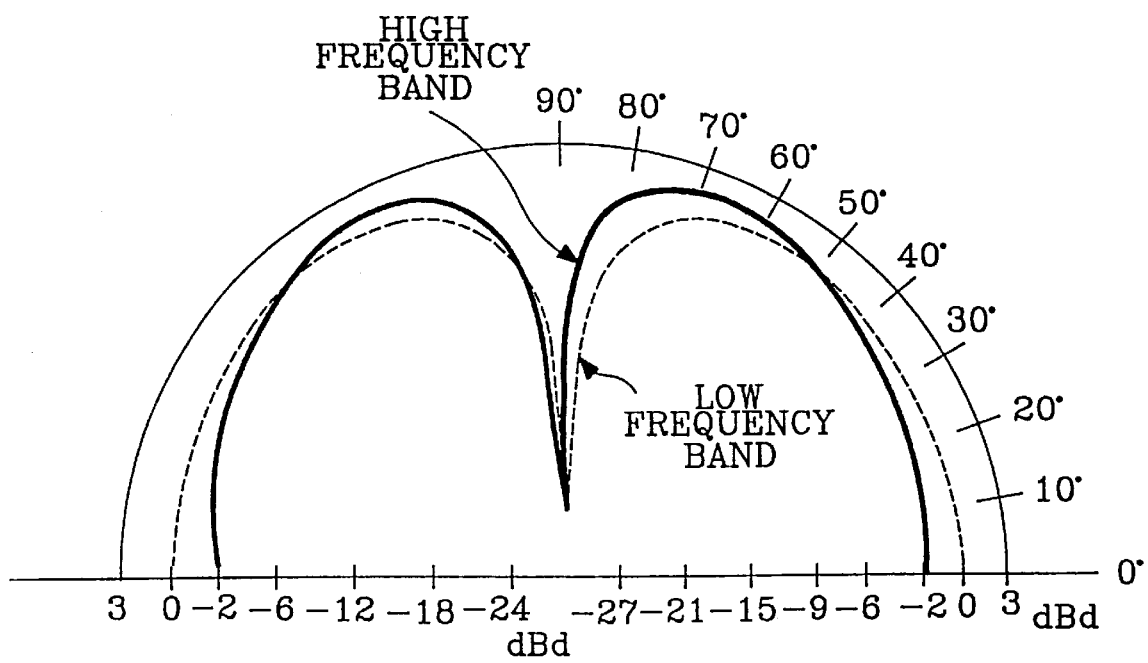
FIG. 8 is a diagram illustrating a radiation pattern measured in comparison with a standard dipole antenna and the dual band antenna according to an embodiment of the present invention.
Figure 9:
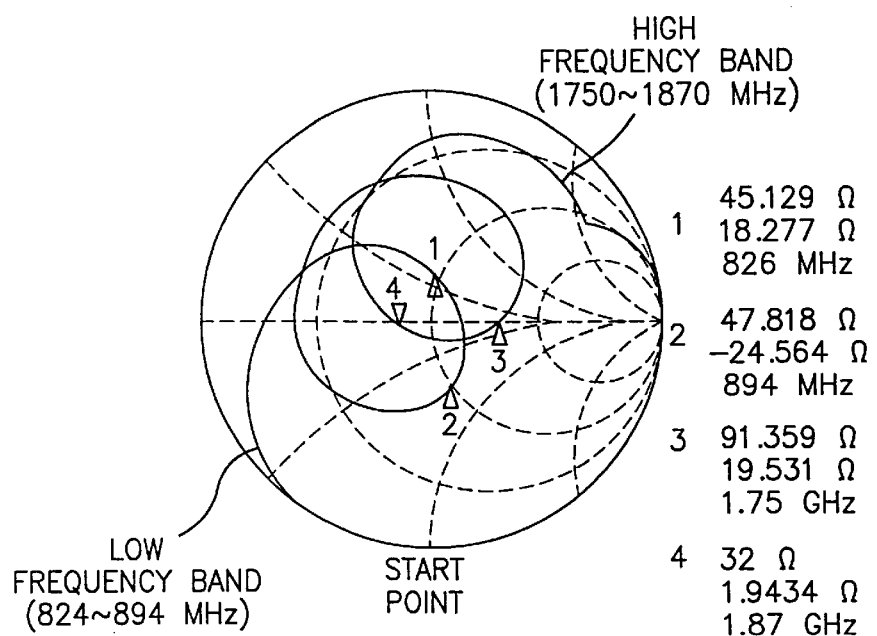
FIG. 9 is a diagram illustrating impedance characteristic of the dual band antenna according to an embodiment of the present invention.
Figure 10:
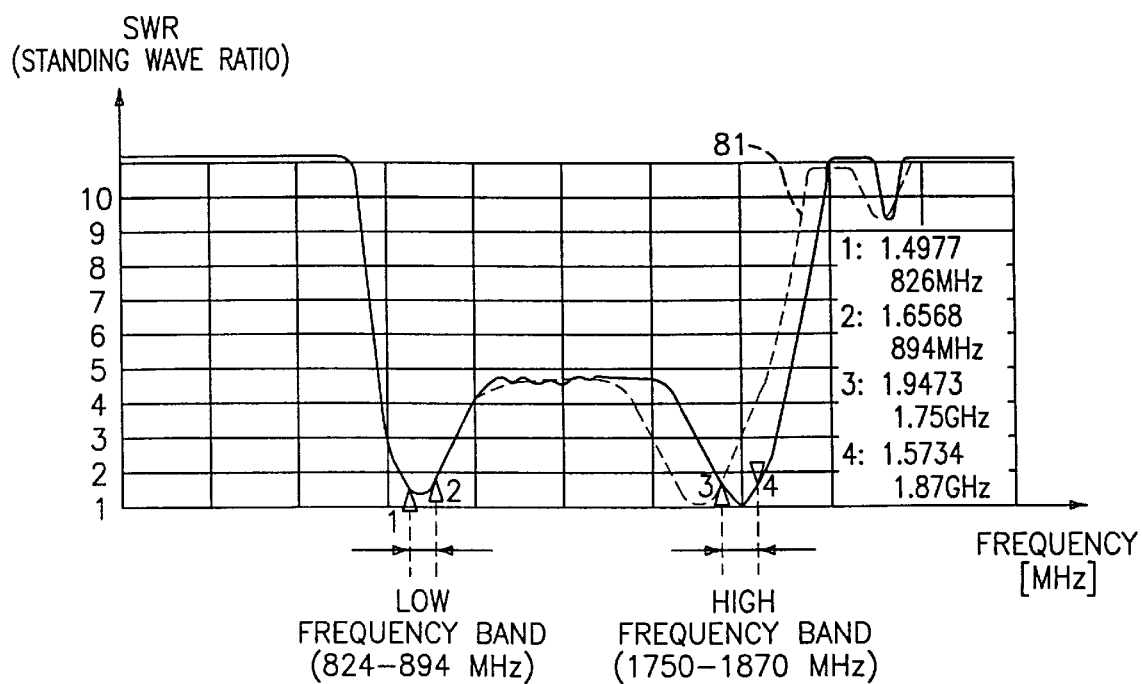
FIG. 10 is a diagram illustrating standing-wave ratio (SWR) of the dual band antenna according to an embodiment of the present invention.

FIG. 8 is a diagram illustrating a radiation pattern measured in comparison with a standard dipole antenna and the dual band antenna according to an embodiment of the present invention. FIG. 9 is a diagram illustrating impedance characteristic of the dual band antenna according to an embodiment of the present invention, and FIG. 10 is a diagram illustrating a standing-wave ratio (SWR) of the dual band antenna according to an embodiment of the present invention. At this moment, the CDMA and Korean PCS frequency of the dual band antenna will be given as follows: the CDMA frequency is 824~849 $MH_z$ upon transmission and 869~894 $MH_z$ upon reception; the Korean PCS frequency is 1750~1780 $MH_z$ upon transmission and 1840~1870 $MH_z$ upon reception. Because the dual band antenna may be applied to systems of the GSM/DECT, GSM/DCS 1800, the AMPS and CDMA/PCS, it can be easily made by varying first length $l_1$ and second length $l_2$ of the choke 60 divided at the point (point K) in which the inner conductor 70 of the coaxial feed line 30 and the signal line 15 are connected with each other as shown in FIG. 2. If the length $l_1 + l_2$ of the choke 60 is varied, the resonant point of the high frequency band is moved, however, as indicated in FIG. 10 by the dotted line 81, the resonant point of the low frequency band is barely moved as shown in FIG. 10. Referring to the solid line as thickly indicated in FIG. 9, an interval Δ from a start point to point 3, covering points 1 and 2, shows the characteristic of the low frequency band (824~894 $MH_z$). An interval that returns to the start point by covering points 3 and 4 indicated as Δ shows the characteristic of the high frequency band (1,750~1,870 $MH_z$). The intervals between points 1 and 2, between 3 and 4, are the same as those as shown in FIG. 10.

Figure 11:
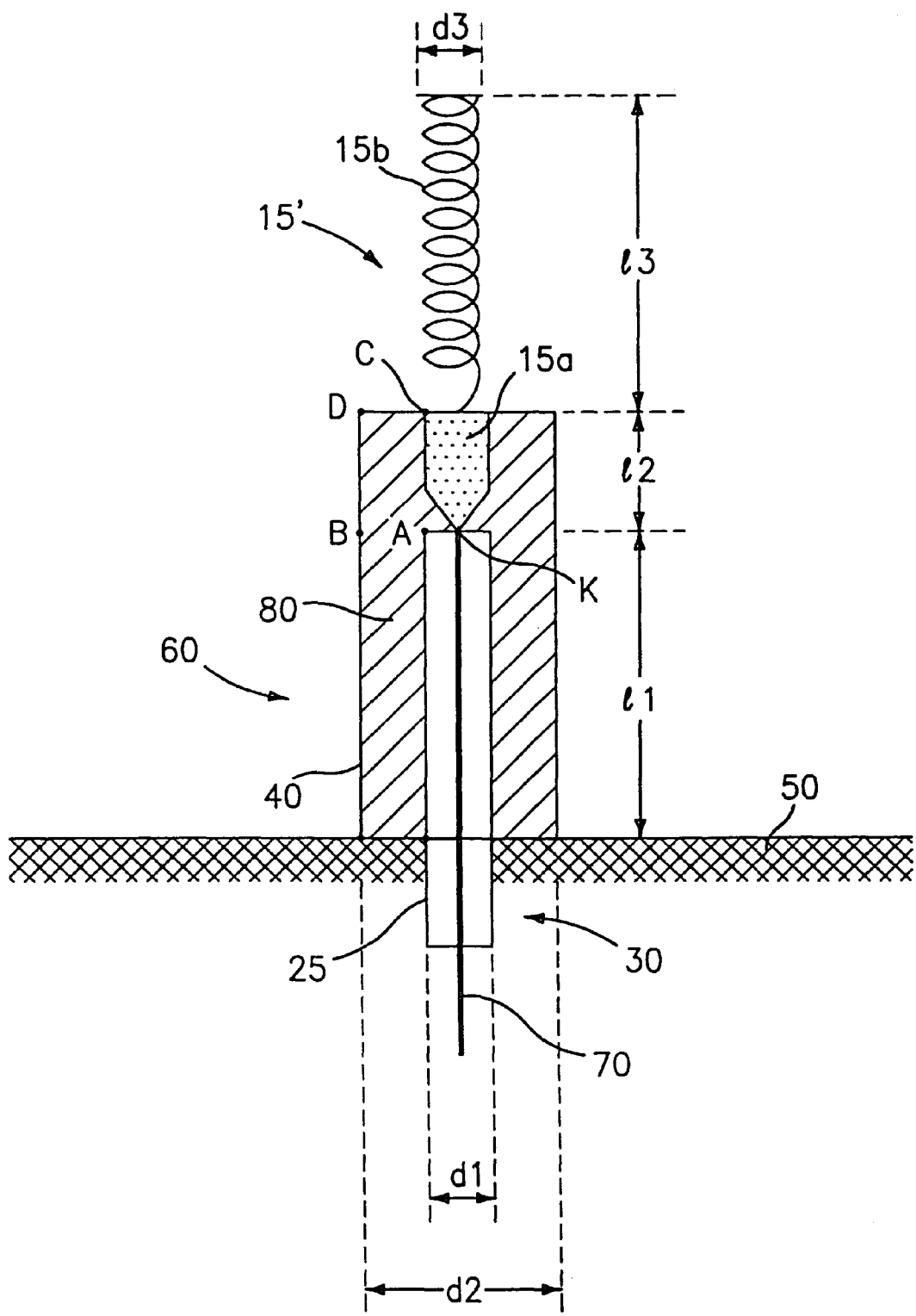
FIG. 11 illustrates another embodiment of the present invention.

FIG. 11 shows an alternate embodiment of the present invention. This embodiment is similar to the embodiment described in connection with FIG. 2, except that the signal line 15 is replaced by a signal line 15'. Signal line 15' consists of a first linear portion 15a of length $l_2$ and a spiral portion 15b of length $l_3$. The diameter of both portions 15a and 15b is d3, although the diameter of the spiral portion 15b may be selected different than the linear portion 15a.

The embodiments of the present invention described above have advantages in that a variable matching circuit is provided, thus a separate matching circuit is not required between a signal source and an antenna, thereby having a simple construction, convenient usage, low price and enhanced performance.

While what has been illustrated and described is considered to be the preferred embodiments of the present invention, it will be understood by those skilled in that art that various changes and modifications may be made, and equivalents may be substituted for elements thereof, without departing from the true scope of the present invention.

What is claimed is:

1. A dual band antenna for a mobile communication system, comprising:

a metal tube having an open end and filled with a solid dielectric material;

a coaxial feed line having inner and outer conductors, said coaxial feed line having one portion extending from a ground plane and being inserted into said metal tube, said portion being completely disposed within said solid dielectric material;

said ground plane connected to a portion of said metal tube opposite said open end and to said outer conductor of said coaxial feed line; and a signal line electrically coupled to said inner conductor and protruding from said metal tube at the open end thereof, the diameter of said signal line and the diameter of said outer conductor of said coaxial feed line being substantially equal, wherein length of said coaxial line from said ground plane to said electrical coupling between said inner conductor and said signal line, length of said signal line from said coupling with said inner conductor to said open end of said metal tube, length of said protruded signal line from said open end of said metal tube, outer diameter of said outer conductor of said coaxial feed line and said substantially equal diameter of said signal line, and diameter of said metal tube having respective predetermined values, whereby in an operating frequency band of said antenna, impedance of said antenna substantially matches impedance of said coaxial line, thereby providing a low standing wave ratio on said coaxial line.

2. The dual band antenna for a mobile communication system as claimed in claim 1, wherein length of said metal tube is longer than a length of said inserted coaxial feed line from said ground plane.

3. The dual band antenna for a mobile communication system as claimed in claim 1, wherein said dielectric material has a dielectric constant greater than that of air for reducing the length of said metal tube for a given electrical length.

4. The dual band antenna for a mobile communication system as claimed in claim 1, wherein outer diameters of said coaxial feed line and said signal line are equal to each other.

5. The dual band antenna for a mobile communication system as claimed in claim 1, wherein a portion of said signal line protruded from said metal tube is shaped in a format of a straight line.

6. The dual band antenna for a mobile communication system as claimed in claim 1, wherein a portion of said signal line protruded from said metal tube is shaped in a format of a spiral line.

7. The dual band antenna for a mobile communication system as claimed in claim 1, wherein the physical length of said metal tube has approximately one-quarter wavelength at a central frequency of a high frequency band.

8. The dual band antenna for a mobile communication system as claimed in claim 2, wherein said dielectric material has a dielectric constant greater than that of air for reducing the length of said metal tube for a given electrical length.

9. The dual band antenna for a mobile communication system as claimed in claim 2, wherein outer diameters of said coaxial feed line and said signal line are equal to each other.

10. The dual band antenna of claim 1, wherein dimensions of said metal tube, dimensions of said signal line and of said coaxial line and dielectric constant of dielectric within said metal tube are selected such that impedance of said antenna is substantially matched to impedance of said coaxial feed line over said dual band.

11. The antenna of claim 10, wherein said dual band comprises a lower frequency band and a higher frequency band substantially twice said low frequency band.

12. The antenna of claim 11, wherein said lower frequency band is from about 824–894 MHz and said higher frequency band is from about 1750–1870 MHz.

13. A dual band antenna for a mobile communication system, comprising:

a metal tube filled with a solid dielectric material;

a coaxial feed line composed of an inner conductor and an outer conductor, said coaxial feed line having one portion extending from a ground plane and being inserted into said metal tube, said portion being completely disposed within said solid dielectric material;

said ground plane connected to one end of said metal tube and to said outer conductor;

a signal line connected to said inner conductor within said metal tube at a connection point within said metal tube, the diameter of said signal line and the diameter of said outer conductor of said coaxial feed line being substantially equal, said outer diameter of said coaxial line being open at said connection point, thereby creating a first radio frequency (RF) choke;

said metal tube having another end that is open to create a second RF choke;

said signal line passing through said metal tube and protruding past said metal tube by a predetermined length;

wherein length of said coaxial line from said ground plane to said connection point between said inner conductor and said signal line, length of said signal line from said connection point with said inner conductor to said open end of said metal tube, length of said protruded signal line from said open end of said metal tube, outer diameter of said outer conductor of said coaxial feed line and said substantially equal diameter of said signal line, and diameter of said metal tube having respective predetermined values, whereby in an operating frequency band of said antenna, impedance of said antenna substantially matches impedance of said coaxial line, thereby providing a low standing wave ratio on said coaxial line.

14. The antenna of claim 13, wherein at least a portion of said metal tube is filled with dielectric and dielectric constant of said dielectric being selected to provide said low standing wave ratio on said coaxial line.

15. The antenna of claim 13, wherein said operating band comprises a dual band including a lower band and a higher band substantially twice said lower band.

16. The antenna of claim 13, wherein said lower band is from about 824–894 MHz and said higher band is from about 1750–1870 MHz.

* * * * *

UNITED STATES PATENT AND TRADEMARK OFFICE
CERTIFICATE OF CORRECTION

PATENT NO.     : 6,377,226 B1                                   Page 1 of 1
DATED          : April 23, 2002
INVENTOR(S)    : Dong-In Ha et al.

It is certified that error appears in the above-identified patent and that said Letters Patent is hereby corrected as shown below:

<u>Title page,</u>
Item [30], Foreign Application Priority Data, should read as follows:
-- Jan. 13, 1997  [KR]  Republic of Korea ......... 639/1997 --

Signed and Sealed this

Seventeenth Day of September, 2002

Attest:

JAMES E. ROGAN
Attesting Officer         Director of the United States Patent and Trademark Office